(12) United States Patent
Freeman et al.

(10) Patent No.: US 12,049,220 B2
(45) Date of Patent: Jul. 30, 2024

(54) METHOD AND SYSTEM FOR DETERMINING WEIGHTS FOR AN ATTENTION BASED METHOD FOR TRAJECTORY PREDICTION

(71) Applicant: Aptiv Technologies AG, Schaffhausen (CH)

(72) Inventors: Ido Freeman, Düsseldorf (DE); Kun Zhao, Duisburg (DE)

(73) Assignee: Aptiv Technologies AG, Schaffhausen (CH)

( * ) Notice: Subject to any disclaimer, the term of this patent is extended or adjusted under 35 U.S.C. 154(b) by 336 days.

(21) Appl. No.: 17/646,634

(22) Filed: Dec. 30, 2021

(65) Prior Publication Data
US 2022/0212660 A1 Jul. 7, 2022

(30) Foreign Application Priority Data
Jan. 4, 2021 (EP) .................................. 21150060

(51) Int. Cl.
| | |
|---|---|
| *B60W 50/00* | (2006.01) |
| *B60W 30/095* | (2012.01) |
| *G01S 13/931* | (2020.01) |
| *G06N 3/02* | (2006.01) |

(52) U.S. Cl.
CPC ...... *B60W 30/095* (2013.01); *B60W 50/0098* (2013.01); *G01S 13/931* (2013.01); *G06N 3/02* (2013.01); *B60W 2050/0022* (2013.01); *B60W 2420/403* (2013.01); *B60W 2420/408* (2024.01); *B60W 2556/35* (2020.02)

(58) Field of Classification Search
None
See application file for complete search history.

(56) References Cited

U.S. PATENT DOCUMENTS

| | | | | |
|---|---|---|---|---|
| 2018/0060666 | A1* | 3/2018 | Song | G06N 3/04 |
| 2020/0341466 | A1* | 10/2020 | Pham | B60W 30/18159 |
| 2021/0146963 | A1* | 5/2021 | Li | G06N 20/00 |
| 2021/0374453 | A1* | 12/2021 | Kuo | G06V 10/82 |
| 2022/0083745 | A1* | 3/2022 | Yuan | G06F 40/30 |

OTHER PUBLICATIONS

"Extended European Search Report", EP Application No. 21150060.8, Jun. 16, 2021, 7 pages.
Bahdanau, et al., "Neural Machine Translation by Jointly Learning to Align and Translate", May 19, 2016, 15 pages.

(Continued)

*Primary Examiner* — James M McPherson
(74) *Attorney, Agent, or Firm* — Harness, Dickey & Pierce, P.L.C.

(57) ABSTRACT

A computer implemented method for determining weights for an attention based trajectory prediction comprises the following steps carried out by computer hardware components: receiving a sequence of a plurality of captures taken by a sensor; determining an unnormalized weight for a first capture of the sequence based on the first capture of the sequence; and determining a normalized weight for the first capture of the sequence based on the unnormalized weight for the first capture of the sequence and a normalized weight for a second capture of the sequence.

18 Claims, 3 Drawing Sheets

(56) References Cited

OTHER PUBLICATIONS

Cho, et al., "Learning Phrase Representations using RNN Encoder-Decoder for Statistical Machine Translation", Sep. 30, 214, 15 pages.
Dang, et al., "Adaptive Exponential Smoothing for Online Filtering of Pixel Prediction Maps", Dec. 2015, pp. 3209-3217.
Kosaraju, et al., "Social-BiGAT: Multimodal Trajectory Forecasting using Bicycle-GAN and Graph Attention Networks", Jul. 17, 2019, 10 pages.
Li, et al., "Attentional-GCNN: Adaptive Pedestrian Trajectory Prediction towards Generic Autonomous Vehicle Use Cases", Nov. 23, 2020, 8 pages.
Sadeghian, et al., "SoPhie: An Attentive GAN for Predicting Paths Compliant to Social and Physical Constraints", Jun. 2018, pp. 1349-1358.
Tang, "Multiple Futures Prediction", Dec. 6, 2019, 11 pages.
Velickovic, et al., "Graph Attention Networks", Feb. 4, 2018, 12 pages.
Xu, et al., "Incorporating Graph Attention and Recurrent Architectures for City-Wide Taxi Demand Prediction", Sep. 2019, 19 pages.

* cited by examiner

METHOD AND SYSTEM FOR DETERMINING WEIGHTS FOR AN ATTENTION BASED METHOD FOR TRAJECTORY PREDICTION

CROSS-REFERENCE TO RELATED APPLICATION

This application claims priority to European Patent Application Number 21150060.8, filed Jan. 4, 2021, the disclosure of which is hereby incorporated by reference in its entirety herein.

BACKGROUND

Predicting a trajectory of an object, for example a vehicle, a cyclist, or a pedestrian, may be an important task in various automotive applications.

Accordingly, there is a need to provide efficient and reliable trajectory prediction.

SUMMARY

The present disclosure relates to methods and systems for determining weights for an attention based trajectory prediction. For instance, the present disclosure provides a computer implemented method, a computer system, a vehicle, and a non-transitory computer readable medium according to the claims, the description, and the drawings.

In one aspect, the present disclosure is directed at a computer implemented method for determining weights for an attention based trajectory prediction, the method comprising the following steps performed (in other words: carried out) by computer hardware components: receiving a sequence of a plurality of captures taken by a sensor; determining an unnormalized weight for a first capture of the sequence based on the first capture of the sequence; and determining a normalized weight for the first capture of the sequence based on the unnormalized weight for the first capture of the sequence and a normalized weight for a second capture of the sequence.

The weights for the attention based method may include or may be the normalized weight or a plurality of such normalized weights.

It is to be understood that with the method a plurality of normalized weights may be determined as described herein.

It is to be understood that the sequence of the plurality of captures may be an interpolated sequence and does not necessarily correspond to a sequence of actual sensor readings.

With the method, a temporal dimension may be observed when focusing the model specific agents. The method may provide a computationally lightweight method.

According to another aspect, a plurality of normalized weights are determined recursively with respect to the captures of the sequence. This allows for a high efficiency of the method, wherein the normalized weights of one capture are used for determining the normalized weights of another capture. In this way, the history of the sequence can be propagated in a very compact way. A recursive depth of one capture is preferred, i.e. the normalized weights of the first capture are based on the normalized weights of only one second capture excluding the first capture. It is understood that the normalized weights of other further captures can nevertheless influence the normalized weights of the first capture, namely through the normalized weights of the "only one second capture". This is due to the recursive nature of information propagation.

According to another aspect, the sequence of captures represents a temporal sequence of captures, and wherein at least some of the captures of the sequence including the second capture and the first capture correspond to different time instances. The sequence of captures may for example include a video sequence, and/or a sequence of radar data and/or a sequence of lidar data.

At least some of the captures of the sequence including the first capture and the second capture correspond to different time instances. In particular, the first may correspond to a first time instance and the second capture corresponds to a second time instance, the first time instance being after the second time instance. This is to say that the further captures represent a history of the sequence, which is used in order to enable processing of the method in real time. However, it is also possible to take the data from a future capture, which is useful if at least some captures can be acquired before determining the normalized weights.

According to another aspect, the first capture corresponds to a first time instance and the second capture corresponds to a second time instance, the second time instance being before the first time instance.

According to another aspect, the normalized weight for the first capture is determined by merging the unnormalized weight for the first capture and the normalized weight for the second capture according to a merging rule. This means that the unnormalized weight for the first capture and the normalized weight for the second capture are fused together, i.e. mathematically combined so as to yield the normalized weight for the first capture. The information of at least two different captures is therefore put together in one normalized weight. In principle, any desired mathematical operation can be used for merging the weights.

According to another aspect, the fused data holds information about all previous time steps and not just the previous one. In other words, for a time step $t>0$, the fused data may be a weighted combination from time steps$[0, 1, \ldots, t-1]$. In other words: The iterative nature of sequential processing keeps the activations of all previous time steps in the system.

According to another aspect, the merging rule defines that the unnormalized weight for the first capture and the normalized weight for the second capture are added using respective factors, and a normalization rule is applied to the resulting sum to obtain the normalized weight for the first capture.

According to another aspect, in the sum, the unnormalized weight for the first capture is multiplied by a first factor, and the normalized weight for the second capture is multiplied by a second factor.

The factors (which may be referred to as a and below) may be trainable parameters. Since only two additional parameters are used, a lightweight machine learning model may be provided. In particular for a model with commonly thousands of parameters, the additional two parameters may be of neglectable overhead. The method may be trainable as a part of the network.

The first factor and the second factor may be used to control the influence of the normalized weight of the second capture on the normalized weight of the first capture (for example when adopting recursive determination of the normalized weights). The larger (or higher) the second factor, the more weight is put on the history of the normalized weights. This applies greater smoothing on the normalized weights of the respective capture.

According to another aspect, the normalization rule comprises an exponential normalization. Exponential normalizations have been found to be very effective in view of improving the trajectory prediction.

The exponential normalization may be defined as the exponential function of a respective one of the weights divided by the sum of the exponential functions of at least some, preferably all, of the weights. For example, let there be two weights p1 and p2. The exponentially normalized version of the first value p1 can then be expressed as p1'=exp(p1)/[exp(p1)+exp(p2)], wherein exp ( ) denotes the exponential function. Likewise, the exponentially normalized version of the second value p2 can be expressed as p2'=exp(p2)/[exp(p1)+exp(p2)]. The exponential normalization provided by this formula may be referred to as a SoftMax normalization. The SoftMax function may also be referred to as normalized exponential function and may be a generalization of the logistic function to multiple dimensions.

According to another aspect, the unnormalized weight for the first capture is generated by using an artificial neural network, which may, for short, be referred to as "neural network". Derivatives may be computed. The derivates may be integrated into the training scheme of a gradient-based enhancement of the artificial neural network. In more details, the mathematical formality of various embodiments or aspects has clear derivatives with respect to its inputs as well as its parameters (alpha and beta). These derivatives may then be used to propagate error signals through this algorithm, thus allowing for an integration in any gradient-based learning method (for example an artificial neural network or a conditional random field).

According to another aspect, the neural network comprises a convolutional neural network. Convolutional neural networks are a sort of artificial neural networks designed to mimic the human visual processing system from the eye to the visual cortex. They are made of an arbitrary number of consecutive layers which are trained together to fulfil a particular task. Each layer of the convolutional neural network learns to recognize features which are relevant to the specific task in an increasing complexity. Although convolutional neural networks are preferably used, it is emphasized that other means can also be used provided that they are adapted to generate a plurality of unnormalized weights per capture, as explained above.

According to another aspect, the weights are used in a dot product with a feature vector in the attention based method.

According to another aspect, the weights are related to a relevance of respective portions of the feature vector.

The method according to various aspects may be and ad hoc method which may be applied to current art for improvement. "Ad hoc" in this context may be understood to express that the method may be attached to existing models without further modifications or adaptations to the existing system; the method may be provided by a standalone computational unit.

In another aspect, the present disclosure is directed at a computer system, said computer system comprising a plurality of computer hardware components configured to carry out several or all steps of the computer implemented method described herein. The computer system can be part of a vehicle.

The computer system may comprise a plurality of computer hardware components (for example a processor, for example processing unit or processing network, at least one memory, for example memory unit or memory network, and at least one non-transitory data storage). It is to be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a vehicle comprising the computer system described herein. The vehicle may further include the sensor.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

Various aspects may be applied to adaptive cruise control, auto emergency breaking, path planning, and/or (realistic) environment simulations.

BRIEF DESCRIPTION OF THE DRAWINGS

Exemplary embodiments and functions of the present disclosure are described herein in conjunction with the following drawings, showing schematically.

DETAILED DESCRIPTION

Predicting a trajectory of an object, for example a vehicle, a cyclist, or a pedestrian, is an important task in various automotive applications.

According to various embodiments, efficient and reliable trajectory prediction may be provided.

Methods of (or for) trajectory prediction have found widespread use. As one example, trajectory prediction is now used in autonomous applications such as autonomous driving of a vehicle. In such applications not only image data but also data from other sensors, e.g. radar and lidar sensors has to be processed and analyzed with respect to its content, and the trajectory of other vehicles, cyclists or pedestrians may be predicted.

Since the output of the trajectory prediction, i.e. the predicted trajectory (or predicted trajectories, for example of one or more vehicles, of one or more cyclist, and/or one or more pedestrian) forms a safety-critical basis for the automatic application, e.g., automatic generation of instructions for autonomously driving a car, a high reliability of the trajectory prediction may be important.

One problem which hinders a high accuracy of the trajectory prediction is that a single capture is as such not always very reliable. In order to reduce this problem, according to various embodiments, a plurality of subsequent captures, which are a part of a sequence such as a video sequence, may be evaluated. This approach may allow for taking into account temporal dependencies between the predicted trajectory based on the captures, wherein individual outliers that do not fit to a systematic trend can be excluded or at least reduced with respect to its impact on the trajectory prediction.

Attention models and configurations may output two tensors. A first tensor may include a feature vector for each agent in the scene. A second tensor may provide the weights for each agent. The second tensor may correspond to a distribution over the estimated relevancy of the different environment elements. The dot product (multiplication and addition) of the vectors (in other words: of the feature vector and a vector including the weights for each agent) may then be calculated to create a constant sized feature vector in which all agents are incorporated according to their relevancy score.

According to various embodiments a classical transformers framework as described in various publications may be applied.

Distribution may refer to the relevance distribution over all neighbors. For example, if a lane change to the left is planned, the vehicle to the left may be 80% important while the vehicle ahead is only 20% relevant.

Attention vector may be the name of the vector which gives the so said distribution.

Neighbors may refer to agents, for example vehicles, around the ego agent.

Feature values may be understood as the outputs of a given layer of the neural network.

Figure 1:
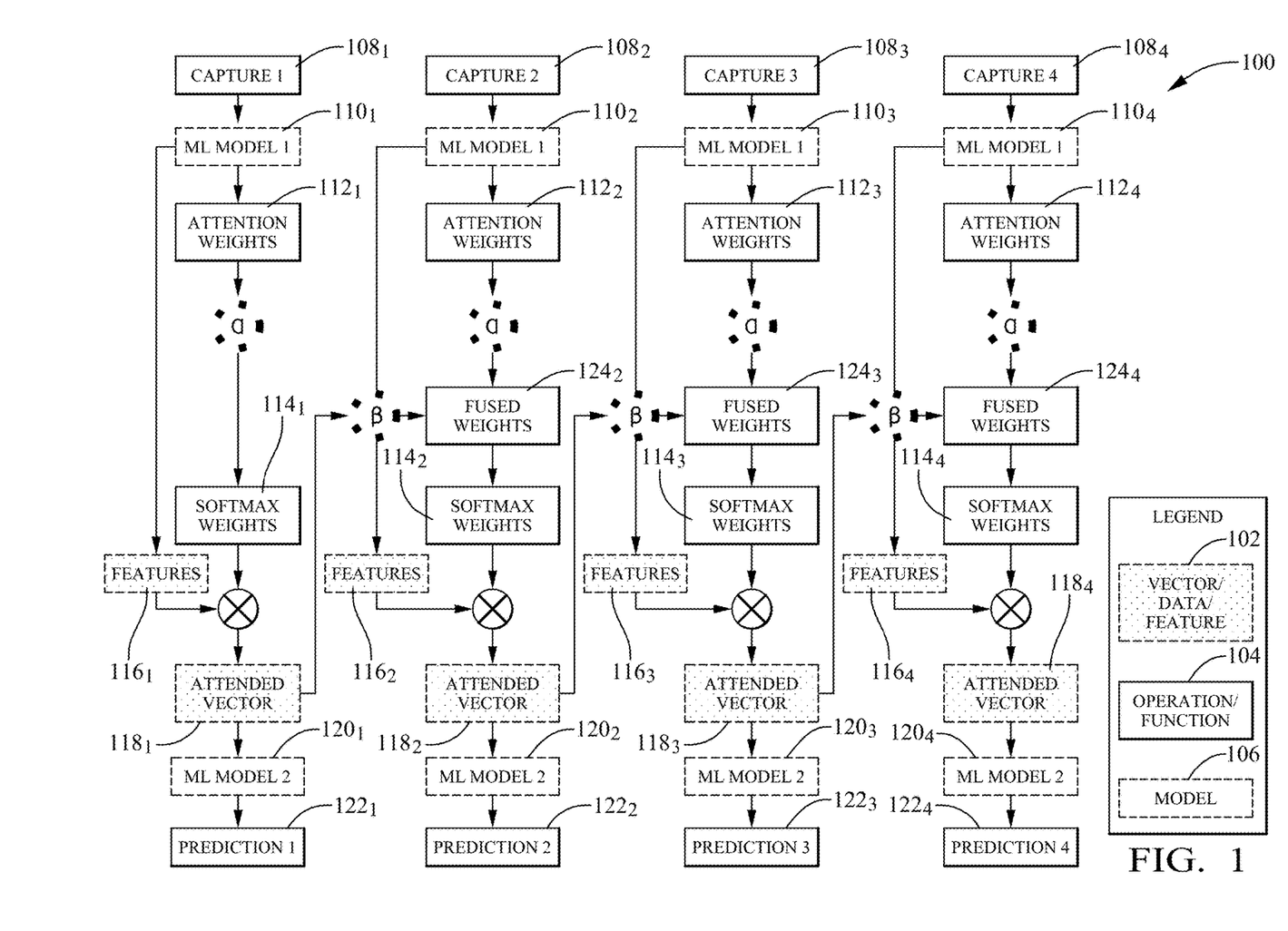
FIG. 1 an illustration of a prediction system according to various embodiments.

FIG. 1 shows an illustration 100 of a prediction system according to various embodiments. Vectors, data, and features are illustrated by shaded boxes, similar to exemplary box 102. Operations and functions are illustrated by solid boxes, similar to exemplary box 104. Models are illustrated by dotted boxes, similar to exemplary box 106.

The respective data, functions or models used or obtained at time step i are indicated by index i.

In each time step i, a capture $108_i$ may be provided to a first machine learning model $110_i$ to obtain attention weights $112_i$ and features $116_i$. The attention weights $112_i$ may be referred to as unnormalized weights.

Fused weights $124_i$ may be determined as a weighted sum of the attention weights $112_i$ (for example multiplied with weighting factor $\alpha$) and the attended vector $118_{i-1}$ of the previous time step (for example multiplied with weighting factor $\beta$). It is to be understood that according to various embodiments, the softmax weight may be used in the weighted sum instead of the attended vector.

The fused weights $124_i$ may undergo a normalization (for example a SoftMax normalization) to obtain the SoftMax weights $114_i$.

It is to be understood that in time step 1, no previous time step is available, and as such, the SoftMax weight $114_1$ may be obtained directly based on the attention weights $112_1$ (without obtaining fused weights).

The SoftMax weights $114_i$ may be multiplied with the features $116_i$ to obtain attended vectors $118_i$, which may be the input to a second machine learning model $120_i$ which yields the predication $122_i$ at time step i.

The features may be arranged agent-wise as a tensor (i.e. the first tensor) of the form [features, agents], e.g. with dimensions [64, 7] for 64 features and 7 agents, i.e. with 64 rows and 7 columns. The attention vector (i.e. the second tensor) may then be a relevance distribution over all agents, i.e. a matrix with the dimensions [7, 1], i.e. with 7 rows and 1 column.

By computing the respective matrix multiplication, a matrix (which actually is a vector) may be obtained in which all features are a weighted sum of the original features over all 7 agents, i.e. the result of the matrix multiplication may have dimensions [64, 1], i.e. 64 rows and 1 column.

In machine learning applications, predictions may be performed based on a large number of variables. According to various embodiments, multiple, (semi-) independent variables may be taken to account while understanding their interactions.

For example, traffic may be more complicated than a single agent task, with an ever-increasing number of agents driving the same roads at the same time, creating complicated interactions.

According to various embodiments, temporal integration may be provided. When processing a time series with a strong temporal consistency, e.g. agent tracks, the temporal dimension may hold information which may be considered according to various embodiments.

The methods and system provided according to various embodiments may be applied to classification and/or regression.

According to various embodiments, temporally adaptive attention for trajectory prediction may be provided.

According to various embodiments, trajectory prediction may be improved by an adaptive temporal method for handling attention.

To encourage the generation of a distribution over the neighbors while not letting the feature values explode (or vanish) as a result of the dot product, the SoftMax normalization may be applied to the weights.

According to various embodiments, the following function may be used:

$$\text{fused}_{\{t=n\}} = \text{softmax}(\alpha * y_{\{t=n\}} + \beta * \text{fused}_{\{t=n-1\}}).$$

$\text{fused}_{\{t=n\}}$ may be the normalized weight related to a first capture (for example at time t=n), $\text{fused}_{\{t=n-1\}}$ may be the normalized weight related to a second capture (for example at time t=n−1, for example one time step preceding the time step t=n related to the first capture), $y_{\{t=n\}}$ may be the unnormalized weight related to the first capture, and $\alpha$ and $\beta$ may be weighting factors. The weighting factors $\alpha$ and $\beta$ may be trained; for example, the weighting factors may be improved together with the network. The gradients with respect to these parameters may be calculated and used to update their values at each training iteration. Alternatively, the weighting parameters may be determined heuristically.

The system may be initialised with zeros. Since the values are SoftMax normalised such that the largest value is 1, it does not affect the results of the first iteration. This may be equivalent to setting $\text{fused}_{\{t=1\}} = \text{softmax}(\alpha * y_{\{t=1\}})$.

Traffic data is mostly sparse in terms of attention, i.e., neighboring agents which are important at timestep $t_0$ are also very likely to be relevant at the next timestep ($t_1$). In these majority of cases, the attention may account for past time steps and have a stable attention vector. However, occasionally an event may occur which demands the immediate attention of the model, e.g. hard breaking. According to various embodiments, the methods allow the model to overrule the temporal fusion and shift the focus immediately.

During training, the network may learn that a strong feature value must relate to a critical event. As an example, it may be assumed that one of the following classes is predicted for our vehicle: [keep at speed, break, accelerate]. In the common case, the network may output certainty values for these classes which are roughly within the range of [0, 5], e.g. [5, 1, 1] represent a strong preference to maintaining current velocity. It is to be noticed that these values are then SoftMax-normalised to a pseudo distribution, that is they are normalised such that they sum up to 1. When the network recognises a situation that may indicate a need for full an immediate attention, e.g. emergency breaking of the leading vehicle, it can output a vector like [0, 50, 0]. Mathematically speaking, such a strong value may suffice to overrule all other values in the system, thus forcing the winning class (which after normalization may have a value of 1 or close to 1, no matter what the other values are, since these other values, in the given example, and may not exceed 5).

Various embodiments may be used on top of any attention model which produces SoftMax weights.

It is to be understood that instead of SoftMax, another normalization function may be used, for example normalization may be provided based on min-max feature scaling.

According to various embodiments, the normalization happens directly on the network activations/predictions (instead of on the unnormalized past predictions). In other words, first, the fusion is carried out and only then the SoftMax is carried out. It has been found that normalizing prior to fusing can have negative properties.

It is to be understood that "weights" as used herein may means the parameters which are used to create the activations which are, in turn, normalised (for example SoftMax-normalised).

Various embodiments may be provided for temporal integration of attention data for trajectory prediction. They may provide an adjustment of normalization and may for example be applied to the field of attention for trajectory prediction. This may provide more efficient and/or more reliable methods for example for adaptive cruise control, path planning, realistic simulations.

Figure 2:
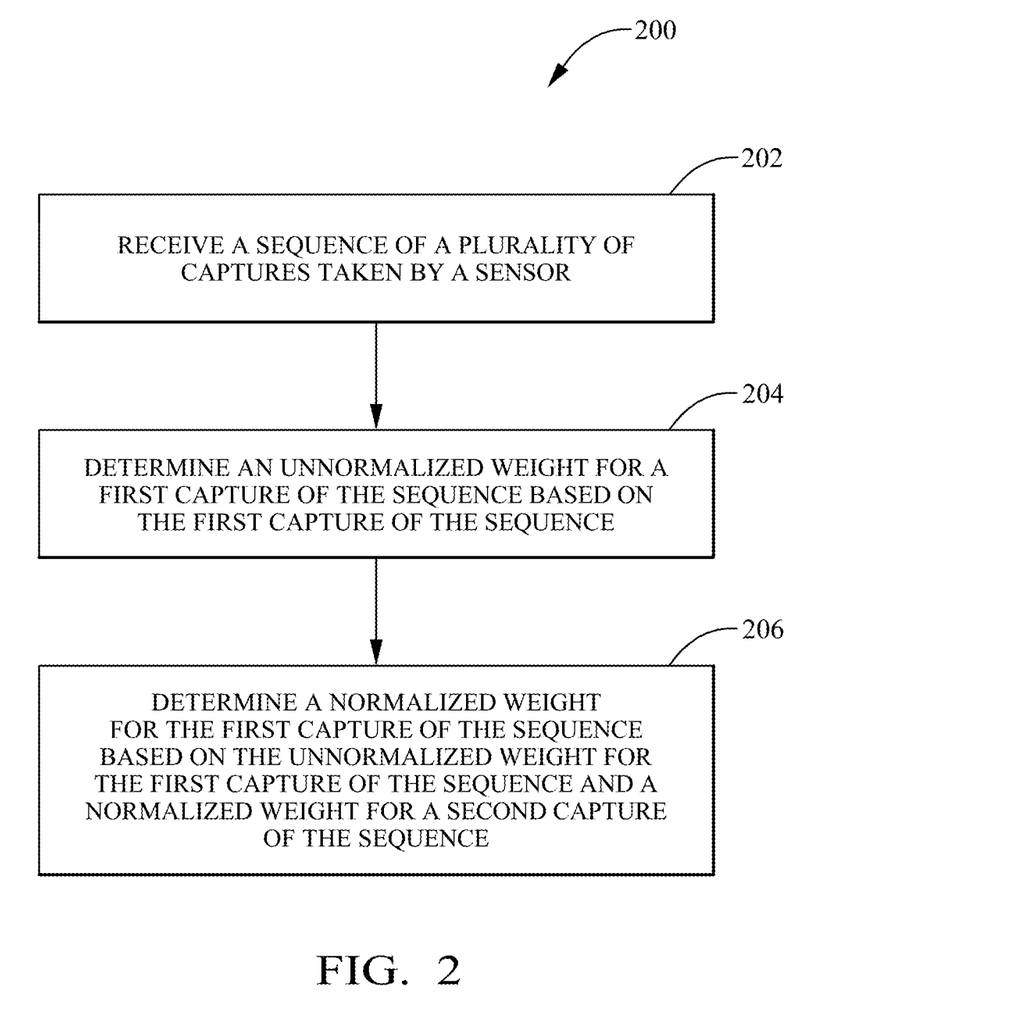
FIG. 2 a flow diagram illustrating a method for determining weights for an attention based method according to various embodiments.

FIG. 2 shows a flow diagram 200 illustrating a method for determining weights for an attention based method according to various embodiments. At 202, a sequence of a plurality of captures taken by a sensor may be received. At 204, an unnormalized weight for a first capture of the sequence may be determined based on the first capture of the sequence. At 206, a normalized weight for the first capture of the sequence may be determined based on the unnormalized weight for the first capture of the sequence and a normalized weight for a second capture of the sequence.

According to various embodiments, a plurality of normalized weights may be determined recursively with respect to the captures of the sequence.

According to various embodiments, the sequence of captures may represent a temporal sequence of captures, and wherein at least some of the captures of the sequence including the second capture and the first capture correspond to different time instances.

According to various embodiments, the first capture may correspond to a first time instance and the second capture may correspond to a second time instance. The second time instance may be before (in other words: preceding) the first time instance.

According to various embodiments, the normalized weight for the first capture may be determined by merging the unnormalized weight for the first capture and the normalized weight for the second capture according to a merging rule.

According to various embodiments, the merging rule may define that the unnormalized weight for the first capture and the normalized weight for the second capture are added using respective factors, and a normalization rule may be applied to the resulting sum to obtain the normalized weight for the first capture.

According to various embodiments, in the sum, the unnormalized weight for the first capture may be multiplied by a first factor, and the normalized weight for the second capture may be multiplied by a second factor.

According to various embodiments, the normalization rule may include or may be an exponential normalization.

According to various embodiments, the exponential normalization may include or may be a SoftMax normalization.

According to various embodiments, the unnormalized weight for the first capture may be generated by using a neural network.

According to various embodiments, the neural network may include or may be a convolutional neural network.

According to various embodiments, the weights may be used in a dot product with a feature vector in the attention based method.

According to various embodiments, the weights may be related to a relevance of respective portions of the feature vector.

Each of the steps 202, 204, 206 and the further steps described above may be performed by computer hardware components.

Figure 3:
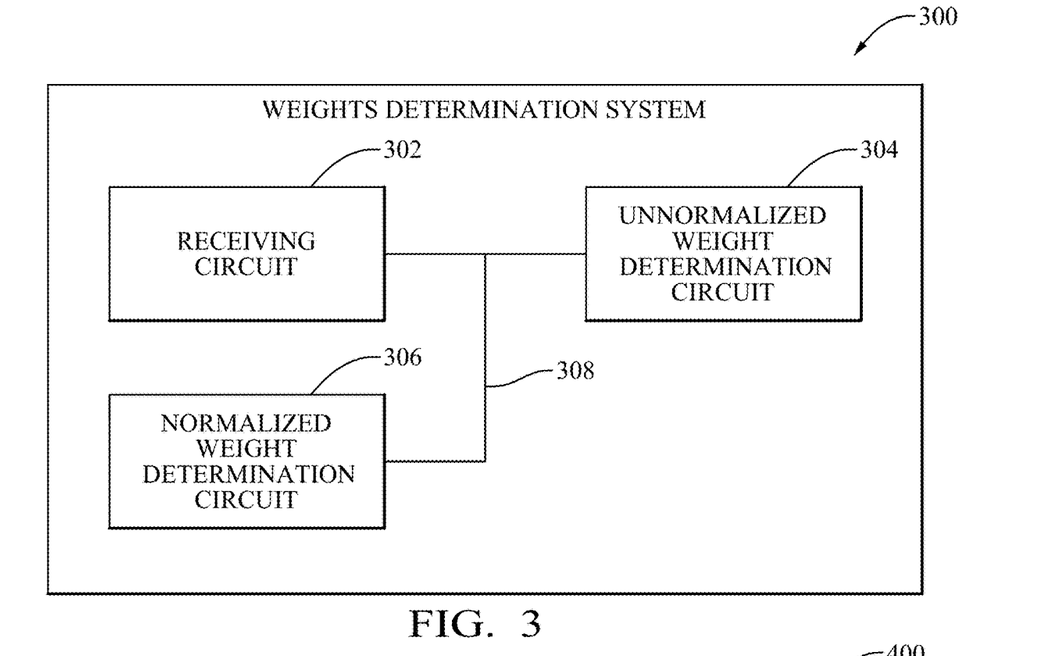
FIG. 3 a weights determination system according to various embodiments.

FIG. 3 shows a weights determination system 300 according to various embodiments. For example, the weights determination system 300 may determine weights for an attention based method. The weights determination system 300 may include a receiving circuit 302, an unnormalized weight determination circuit 304, and a normalized weight determination circuit 306.

The receiving circuit 302 may be configured to receive a sequence of a plurality of captures taken by a sensor.

The unnormalized weight determination circuit 304 may be configured to determine an unnormalized weight for a first capture of the sequence based on the first capture of the sequence.

The normalized weight determination circuit 306 may be configured to determine a normalized weight for the first capture of the sequence based on the unnormalized weight for the first capture of the sequence and a normalized weight for a second capture of the sequence.

The receiving circuit 302, the unnormalized weight determination circuit 304, and the normalized weight determination circuit 306 may be coupled with each other, e.g. via an electrical connection 308, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 4:
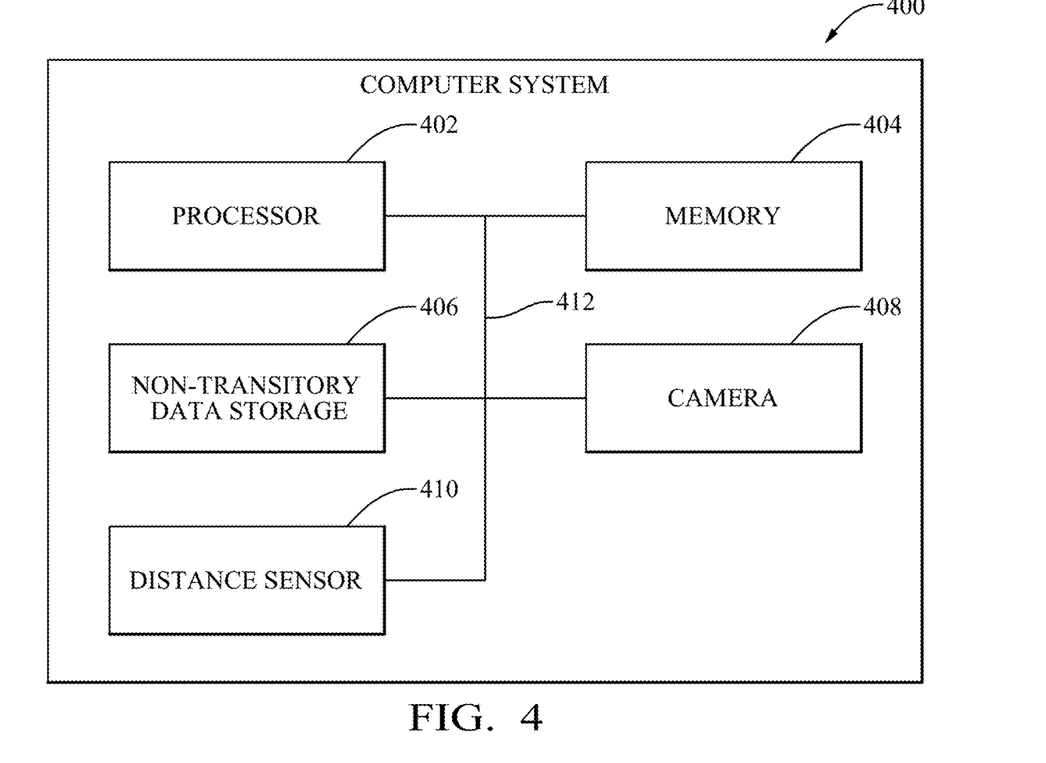
FIG. 4 a computer system with a plurality of computer hardware components configured to carry out steps of a computer implemented method for determining weights for an attention based method according to various embodiments.

FIG. 4 shows a computer system 400 with a plurality of computer hardware components configured to carry out steps of a computer implemented method for determining weights for an attention based method according to various embodiments. The computer system 400 may include a processor 402, a memory 404, and a non-transitory data storage 406. A camera 408 and/or a distance sensor 410 (for example a radar sensor or a lidar sensor) may be provided as part of the computer system 400 (like illustrated in FIG. 4), or may be provided external to the computer system 400.

The processor 402 may carry out instructions provided in the memory 404. The non-transitory data storage 406 may store a computer program, including the instructions that may be transferred to the memory 404 and then executed by the processor 402. The camera 408 and/or the distance sensor 410 may be used to determine captures.

The processor 402, the memory 404, and the non-transitory data storage 406 may be coupled with each other, e.g. via an electrical connection 412, such as e.g. a cable or a computer bus or via any other suitable electrical connection to exchange electrical signals. The camera 408 and/or the distance sensor 410 may be coupled to the computer system 400, for example via an external interface, or may be provided as parts of the computer system (in other words: internal to the computer system, for example coupled via the electrical connection 412).

The terms "coupling" or "connection" are intended to include a direct "coupling" (for example via a physical link) or direct "connection" as well as an indirect "coupling" or indirect "connection" (for example via a logical link), respectively.

It is to be understood that what has been described for one of the methods above may analogously hold true for the weights determination system 300 and/or for the computer system 400.

What is claimed is:

1. A method comprising:
    determining, by computer hardware components, weights for an attention based trajectory prediction, the weights for the attention based trajectory prediction determined by:
        receiving a sequence of a plurality of captures taken by a sensor including a first capture of the sequence captured at a first time instance and a second capture of the sequence captured at a second time instance after the first time instance,
        determining a normalized weight for the first capture of the sequence,
        determining an unnormalized weight for the second capture of the sequence using a first machine learning model that generates (i) a feature tensor corresponding to an object captured in the sequence of the plurality of captures, and (ii) the unnormalized weight as a second tensor,
        and
        determining, based on the unnormalized weight for the second capture of the sequence and the normalized weight for the first capture of the sequence, a normalized weight for the second capture of the sequence such that normalized weight of the second capture in the sequence includes information regarding the normalized weight of the first capture in the sequence;
    predicting, by the computer hardware components, the trajectory of the object based on the normalized weight for the first capture of the sequence and the normalized weight for the second capture of the sequence by:
        obtaining an attended vector for the second capture of the sequence based on the feature tensor and the normalized weight for the second capture of the sequence, and
        predicting the trajectory of the object using a second machine learning model that generates a predicted trajectory based on the attended vector; and
    autonomously controlling, by the computer hardware components, a driving of a vehicle based at least on the predicted trajectory of the object.

2. The method according to claim 1, further comprising: recursively determining a plurality of normalized weights for the sequence including the normalized weight for the first capture of the sequence, the normalized weight for the second capture of the sequence, and a normalized weight for each other capture of the sequence.

3. The method according to claim 1, wherein the sequence of captures represents a temporal sequence of captures, and wherein at least some of the captures of the sequence including the first capture of the sequence and the second capture of the sequence correspond captures taken by the sensor at different time instances.

4. The method according to claim 1, wherein determining the normalized weight for the second capture of the sequence comprises determining the normalized weight for the second capture of the sequence by:
    merging, according to a merging rule, the unnormalized weight for the second capture of the sequence and the normalized weight for the second capture of the sequence.

5. The method according to claim 4, wherein the merging rule defines that the normalized weight for the first capture and the unnormalized weight of the second capture are added using respective factors, and the method further comprising:
    applying a normalization rule to a resulting sum to obtain the normalized weight for the first capture.

6. The method according to claim 5, wherein applying the normalization rule to the resulting sum comprises multiplying the unnormalized weight for the second capture is by a second factor, and multiplying the normalized weight for the first capture by a first factor.

7. The method according to claim 5, wherein the normalization rule comprises an exponential normalization.

8. The method according to claim 7, wherein the exponential normalization comprises a SoftMax normalization.

9. The method according to claim 1, wherein the first machine learning model is a neural network.

10. The method according to claim 9, wherein the neural network comprises a convolutional neural network.

11. The method according to claim 1, further comprising: using the weights for determining a dot product with a feature vector in determining the attention based trajectory prediction to determine a relevance of respective portions of the feature vector.

12. A computer system, comprising:
    a plurality of computer hardware components configured to,
        determine weights for an attention based trajectory prediction by:
            receiving a sequence of a plurality of captures taken by a sensor including a first capture of the sequence captured at a first time instance and a second capture of the sequence captured at a second time instance after the first time instance, determining a normalized weight for the first capture of the sequence, determining an unnormalized weight for the second capture of the sequence using a first machine learning model that generates (i) a feature tensor corresponding to an object captured in the sequence of the plurality of captures, and (ii) the unnormalized weight as a second tensor, and determining, based on the unnormalized weight for the second capture of the sequence and the normalized weight for the first capture of the sequence, a normalized weight for the second capture of the sequence such that normalized weight of the second capture in the sequence includes information regarding the normalized weight of the first capture in the sequence;

predicting, by the computer hardware components, the trajectory of the object based on the normalized weight for the first capture of the sequence and the normalized weight for the second capture of the sequence by:

obtaining an attended vector for the second capture of the sequence based on the feature tensor and the normalized weight for the second capture of the sequence, and predicting the trajectory of the object using a second machine learning model that generates a predicted trajectory based on the attended vector; and autonomously controlling, by the computer hardware components, a driving of a vehicle based at least on the predicted trajectory of the object.

13. The computer system according to claim 12, the steps further comprising:

recursively determining a plurality of normalized weights for the sequence including the normalized weight for the first capture of the sequence, the normalized weight for the second capture of the sequence, and a normalized weight for each other capture of the sequence.

14. The computer system according to claim 12, wherein the sequence of captures represents a temporal sequence of captures, and wherein at least some of the captures of the sequence including the first capture of the sequence and the second capture of the sequence correspond captures taken by the sensor at different time instances.

15. The computer system according to claim 12, wherein the steps for determining the normalized weight for the second capture of the sequence comprises:

merging, according to a merging rule, the unnormalized weight for the second capture of the sequence and the normalized weight for the first capture of the sequence.

16. The computer system according to claim 15, wherein the merging rule defines that the unnormalized weight for the second capture and the normalized weight for the first capture are added using respective factors, and a normalization rule is applied to a resulting sum to obtain the normalized weight for the second capture.

17. The computer system of claim 12, wherein the computer system is part of the vehicle.

18. A non-transitory computer readable medium comprising instructions for configuring a computer system to:

determine weights for an attention based trajectory prediction by:

receiving a sequence of a plurality of captures taken by a sensor including a first capture of the sequence captured at a first time instance and a second capture of the sequence captured at a second time instance after the first time instance, determining a normalized weight for the first capture of the sequence, determining an unnormalized weight for the second capture of the sequence using a first machine learning model that generates (i) a feature tensor corresponding to an object captured in the sequence of the plurality of captures, and (ii) the unnormalized weight as a second tensor, and determining, based on the unnormalized weight for the second capture of the sequence and the normalized weight for the first capture of the sequence, a normalized weight for the second capture of the sequence such that normalized weight of the second capture in the sequence includes information regarding the normalized weight of the first capture in the sequence;

predict the trajectory of the object based on the normalized weight for the first capture of the sequence and the normalized weight for the second capture of the sequence by:

obtaining an attended vector for the second capture of the sequence based on the feature tensor and the normalized weight for the second capture of the sequence, and predicting the trajectory of the object using a second machine learning model that generates a predicted trajectory based on the attended vector; and autonomously control a driving of a vehicle based at least on the predicted trajectory of the object.

* * * * *